F. GRUBER.
HYDRAULIC RAM.
APPLICATION FILED APR. 20, 1911.
1,012,633.
Patented Dec. 26, 1911.
2 SHEETS—SHEET 2.
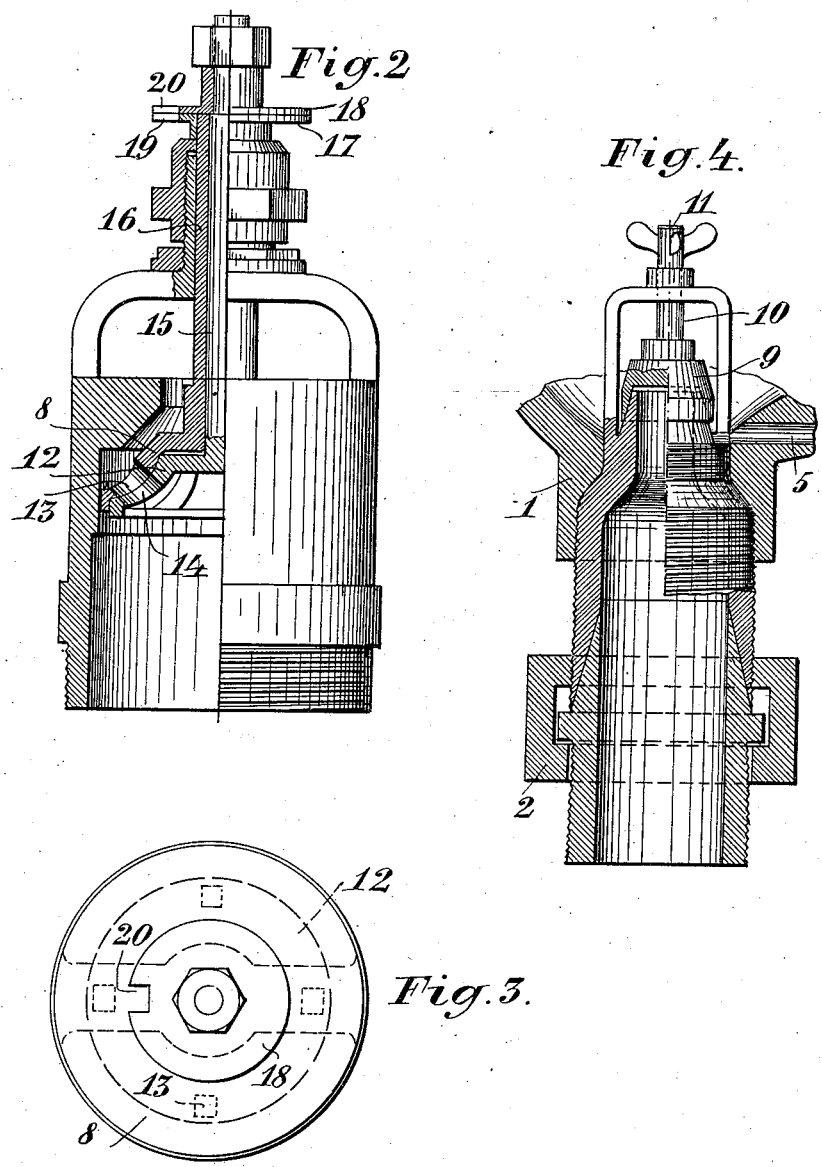

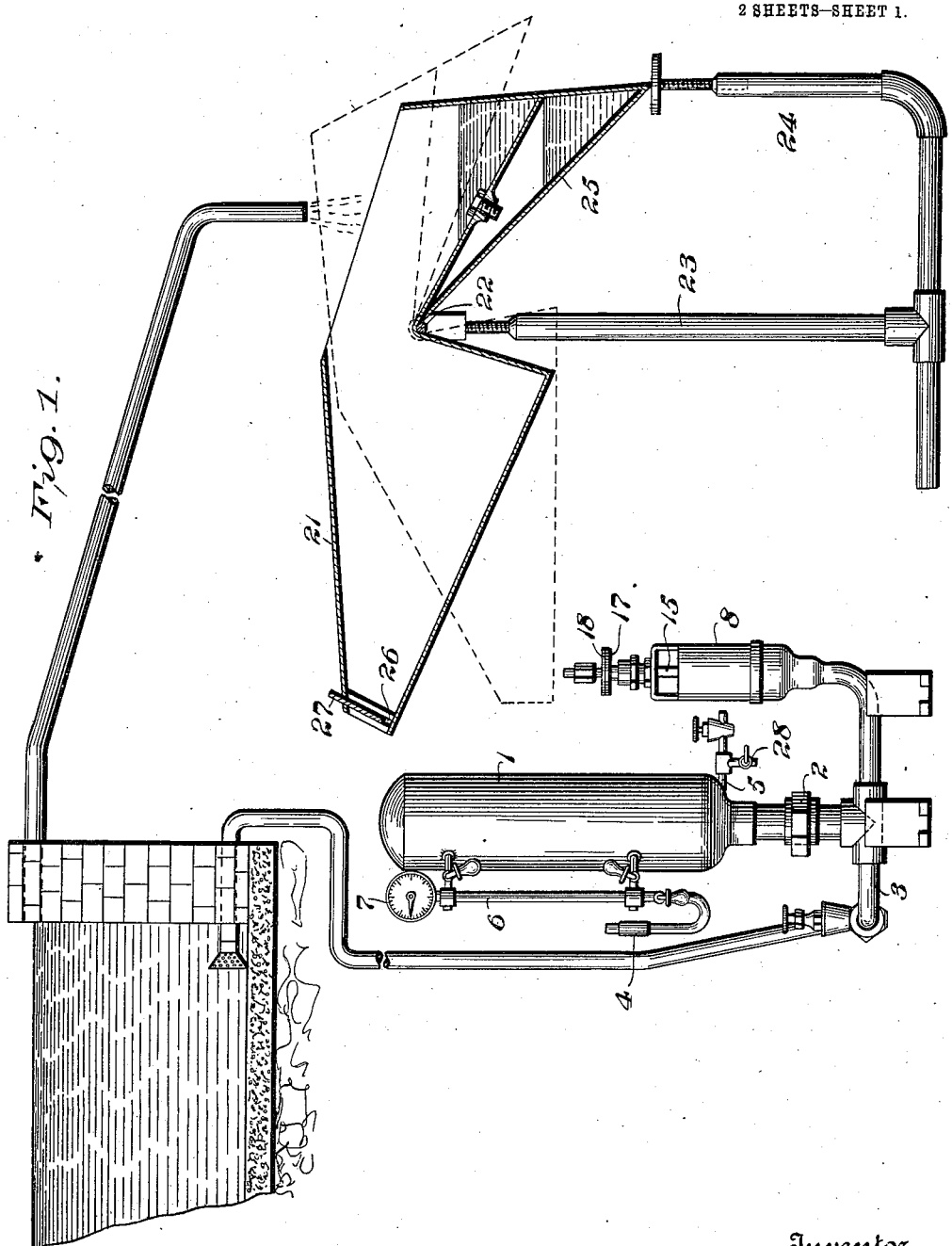

UNITED STATES PATENT OFFICE.

FERDINAND GRUBER, OF VIENNA, AUSTRIA-HUNGARY.

HYDRAULIC RAM.

1,012,633.    Specification of Letters Patent.    Patented Dec. 26, 1911.

Application filed April 20, 1911. Serial No. 622,392.

*To all whom it may concern:*

Be it known that I, FERDINAND GRUBER, a subject of the Austro-Hungarian Emperor, residing at Vienna, Austria-Hungary, have invented new and useful Improvements in Hydraulic Rams, of which the following is a specification.

This invention relates to hydraulic rams and the improvements have for their object to increase the efficiency of hydraulic rams so as to render them suitable for delivering at high levels and for utilizing small supplies of driving water.

According to this invention air is pumped into the air vessel in proportion to the water column contained in the driving and delivering water pipes whereby a too high compression of the air is prevented so that there is always a comparatively large air cushion in the air vessel and only a small portion of the oxygen is taken up by the water.

The invention also consists in improvements in the pressure and impact valves, in means for connecting the air vessel to the supply water pipe without any flanges or packings. All these improvements tend to increase the efficiency of a hydraulic ram whereby the improved ram is enabled to raise water to considerably greater heights than is possible with existing rams.

The invention also comprises an automatic starting device for hydraulic rams.

Various constructions of automatic starting devices have already been proposed but they have not been found suitable in practice owing to their complicated construction and unreliability in working.

The improved starting device comprises a vessel constructed as a balance arranged above the impact valve and caused to oscillate by the inflow and outflow of water so as thereby to operate the impact valve.

One form of this invention is illustrated by way of example in the accompanying drawings in which:—

Figure 1 is a side elevation, partly in vertical section of the improved apparatus, Fig. 2 is an elevation partly in section, and Fig. 3 is a plan of the improved impact valve, Fig. 4 is an axial section of the improved delivery valve.

1 is the air vessel which is connected by means of a peculiar coupling device 2 to the driving water pipe 3.

4 is a branch pipe leading from the air vessel, provided with an air valve to which an air pump can be connected for pumping air into the air vessel.

9 is a delivery valve closing the lower end of the air vessel.

The air vessel 1 to which the delivery pipe 5 is connected is provided with a water gage 6 and a pressure gage 7 for indicating the water level and the pressure in the air vessel at any moment.

28 is a cock on the delivery pipe 5, having for its object to enable the air vessel and delivery pipe to be emptied.

The whole of the connections are effected by means of screw devices and special union nuts so as to enable all packings to be dispensed with. The ends of the parts to be connected engage conically one with the other as indicated in Fig. 4, so that the connected parts can be pressed firmly one into the other by tightening up the union nut. Compared with the existing flange coupling the connection of the air vessel 1 to the driving water pipe 3 by means of a special coupling 2, has also the great advantage that the air vessel can be connected in any suitable position of the driving water pipe 3 to the delivery pipe 5 so that the ram can be adapted readily to existing conditions.

The driving water pipe 3 is bent at a right angle in such a manner, that the change in its direction is gradual. The pipe portion leading to the impact valve is bent in a similar manner. This arrangement while allowing of an easy movement of the water column in the pipe serves also to dam the water in the pipe so that it is not necessary to load the impact valve specially as has hitherto been necessary in existing rams working with a high head of supply water.

The impact valve 8 is placed at a higher level than the pressure valve 9 closing the lower end of the air vessel so that a water column is formed under the impact valve which aids the entrance of the inflowing water into the air vessel.

In existing rams the delivery valve has hitherto been almost without exception a flap valve. Apart from the difficulty of keeping a flap valve tight this arrangement had the drawback that a large area is presented to the action of the pressure water in the air vessel so that the valve could open only with difficulty and the water could only enter the air vessel in a one sided manner. The improved pressure valve is formed with an axially slidable part 9, provided with a conical extension projecting into the air vessel 1. By this means the valve presents a minimum area to the action of the overlying water and in lifting it drills its way as it were into the pressure fluid. When a great quantity of sand is carried in suspension in the water it is advisable to cover the operative surfaces of the valve with leather. The axial movement of the valve part allows also the water to pass all around out from the supply pipe into the air vessel. The guide bridge of the valve is preferably made adjustable in a vertical direction so as to enable the lift of the valve to be regulated.

The delivery valve may be provided with screw vanes 11 formed either on the valve part or on the guide pin 10. By this means when the valve is operated it is gradually caused to rotate whereby the relative position between the valve parts and the valve seat is caused to constantly change so that choking of the valve with sand or the like, and an unequal or one-sided wear of the valve is effectively prevented.

12 is an inset provided in the valve part 8 of the impact valve as shown in Fig. 2; it is formed with openings 14 corresponding with the exit openings 13 of the valve part 8. The clear area of outflow through the openings 13 can be varied as required or desired by turning the inset. This device allows of varying as desired the cross sectional area of flow of the water without altering the lift of the valve and of utilizing small supplies of water with almost the same efficiency for a continuous operation of the ram.

In the construction shown in Fig. 2 the guide for the impact valve 8 is composed of a tube 16 in which a stem 15 is mounted that is connected to the inset 12. A disk 17 is fixed on the tube 16 and a disk 18 is fixed on the stem 15. The two disks 17, 18 are formed respectively with apertures 19, 20, corresponding to the width of the outflow openings in the valve part. The disks 17 and 18 are fixed in such positions on the tube and stem respectively that the recesses 19, 20, will coincide completely with each other when the openings 13 of the valve part 8 are situated exactly over the openings 14 in the inset 12, that is to say, are completely opened. The disks 17, 18, therefore not only indicate at all times the position of the inset in the valve part, but also indicate at all times the amount of free cross sectional area of flow for the water. The tube 16 is further provided with a stop constituted by a nut by shifting which the lift of the valve can be regulated when necessary.

In order to start a hydraulic ram it is necessary to operate the impact valve, that is to say, the valve part must be forced down against the action of the water under it. When the water supply is small this starting of the ram must be effected sometimes two or three times in one day. The improved ram is started automatically according to this invention by means of a vessel constructed in the form of a balance arranged above the impact valve. This vessel in its normal position is situated within the range of a duct leading from the water reservoir, so that the said vessel becomes filled and then tips over, striking and thereby forcing down the impact valve. The impact valve is held down until the vessel is emptied and returns into its normal position. When the ram is started it takes water from the reservoir and thereby cuts off the flow of water to the starting vessel.

In the constructional example shown in Fig. 1 the vessel 21 is rotatably mounted on a horizontal axle 22 of a vertically adjustable framing 23. The bottom of the vessel is stepped so that two chambers are formed in the vessel. The vessel 21 is balanced in such a manner that in its normal position its rear portion rests upon a support 24 provided on the framing 23. In the example shown the balancing of the vessel is effected by means of a chamber 25 provided in the rear portion of the vessel in which shot, sand, water or other weighting material is placed. If desired the balancing may be effected by means of sliding weight provided on the vessel.

In its normal position the vessel is situated within the range of an overflow duct of the reservoir whereby water can enter the vessel. At first the rear portion of the vessel becomes filled with water until the water level has risen to such a height that the water can pass over into the front portion of the vessel. The front chamber is considerably larger than the rear chamber, and consequently the front portion of the vessel 21 will overbalance the rear portion and thus tilt the vessel. Thereupon the liquid contained in the rear portion of the vessel will suddenly flow over into the front chamber and thereby cause the front portion of the vessel to deal a powerful blow upon the impact valve situated underneath it.

The vessel 21 is provided in its front end with an outlet 26 which can be closed by means of a flap or slide 27 whereby the time required to empty the vessel can be regulated as desired according to the position of the slide.

In its tipped position the vessel is situated out of the range of the inflow of the water. The water contained in the vessel flows out through the opening 26 and finally the rear portion of the vessel becomes preponderant and the vessel resumes its normal position. The ram in its operation takes the water from the reservoir and thus cuts off the inflow of water to the starting vessel. If the ram should happen to stop, the water rises in the reservoir and finally flows again into the starting vessel, whereupon the latter comes again into operation and thereby imparts the necessary impulse to the impact valve for restarting the ram.

What I claim is:—

1. In a hydraulic ram, an impact valve having a tubular body provided at one end with a head which is apertured to permit water to flow therethrough when disengaged from its seat, a controlling disk carried by a stem that extends through the tubular body of the valve, said disk being adapted to open or close the apertures in the head of the valve, and means connected with the body of the valve and stem of said disk for indicating the extent to which said apertures are opened.

2. In a hydraulic ram, an impact valve comprising a stem and a head the latter having an aperture for the passage of water when the valve is moved from its seat, a controlling disk supported to rotate about the axis of the valve stem and having an aperture adapted by such movement to be shifted to and from alinement with the aperture in the valve, and an indicator comprising two parallel exposed disks connected respectively to the valve stem and controller disk and each provided with an opening corresponding in relative positions to the aforesaid openings in the valve and controller disk.

3. In a hydraulic ram, an impact valve comprising a stem and a head the latter having an aperture for the passage of water when the valve is moved from its seat, a controlling disk supported to rotate about the axis of the valve stem and having an aperture adapted by such movement to be shifted to and from alinement with the aperture in the valve, and an indicator comprising two parallel exposed disks connected respectively to the valve stem and controller disk and each provided with a peripheral notch so positioned that the relative position thereof indicates the extent to which the aperture in the valve head is uncovered by the controller disk.

4. In a hydraulic ram, the combination with an impact valve, of a receptacle having its interior divided into two compartments arranged on opposite sides of a pivotal support, one of said compartments extending over the impact valve and the other adapted to receive water from the source of supply for the ram, and to discharge into the first said compartment, said receptacle being automatically rocked to move the valve from its seat when a predetermined quantity of water is collected therein.

5. In a hydraulic ram, the combination with an impact valve, of a pivotally mounted receptacle having its interior divided into two compartments, situated on opposite sides of the axis of the receptacle, one of said compartments being adapted to receive water from the source of supply for the ram and the other said compartment receiving its supply from the first said compartment, said receptacle being rocked about its axis and acting to effect movement of the impact valve from its seat by the accumulation of water in the second said compartment.

6. In a hydraulic ram, the combination with an impact valve, of a pivotally mounted receptacle having its interior divided into two compartments situated on opposite sides of the axis of the receptacle, one of said compartments being adapted to receive water from the source of supply for the ram and adapted to discharge into the other said compartment after a predetermined quantity of water has been accumulated, the rocking movement of said receptacle caused by accumulation of water in the second of said compartments acting to shift the impact valve from its seat, and means whereby when the receptacle has been rocked as aforesaid water will be discharged from both compartments.

7. In a hydraulic ram, the combination with an impact valve, of a pivotally mounted receptacle having its interior divided into two compartments situated on opposite sides of the axis of the receptacle, one of said compartments being adapted to receive water from the source of supply for the ram and adapted to discharge into the other said compartment after a predetermined quantity has been accumulated, the second said compartment extending over the impact valve and having an adjustable device for controlling the flow of water from the receptacle, substantially as and for the purpose described.

In testimony whereof I have signed my name to this specification in the presence of two subscribing witnesses.

FERDINAND GRUBER.

Witnesses:
　ADOLF URBANTSCHITSCHY,
　AUGUST FUGGER.